United States Patent Office 3,578,639
Patented May 11, 1971

3,578,639
POLYAMIDE-IMIDE-UREAS AND METHOD OF PREPARATION
Howard E. Sheffer, Burnt Hills, N.Y., assignor to Schenectady Chemicals, Inc., Schenectady, N.Y.
No Drawing. Filed Oct. 13, 1967, Ser. No. 675,020
Int. Cl. C08g 20/32
U.S. Cl. 260—77.5                                8 Claims

ABSTRACT OF THE DISCLOSURE

Polyamide-imides are prepared by reacting trimellitic anhydride with an aromatic diisocyanate. The product gives smoother films or copper wire than products prepared by reacting trimellitic anhydride mono acid chloride with an aromatic diamine and also does not have amic acid groups. A portion of the aromatic diisocyanate can be replaced by an aromatic diamine to form polymer groups. Cross-linking can be introduced by adding small amounts of isocyanates having at least three isocyanate groups.

It is known to prepare wire enamels from polyamide-imides prepared by reacting trimellitic anhydride mono acid chloride with an aromatic diamine, e.g. methylene dianiline, e.g. see Belgian Pat. 650,979 and Lavin U.S. Pat. 3,260,691. However, the products thus obtained do not give as smooth a film on electrical conductors, e.g. copper wire, as desired. In addition the polymer present in the enamel contains unconverted amic acid groups in addition to the imide and amide linkages. The Belgian patent points out in Examples 5 to 7 that if the trimellitic anhydride mono acid chloride is replaced by trimellitic anhydride the resulting product gives a brittle film which is unsuitable for use as a coating.

It is an object of the present invention to prepare novel amide-imide polymers.

Another object is to prepare an electrical conductor coated with such a polymer and having improved properties.

A further object is to prepare amide-imide polymers containing urea linkages.

Yet another object is to prepare amide-imide polymers containing cross-linking agents.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting trimellitic anhydride with an aromatic diisocyanate to form a polyamide-imide. The product is substantially free of amic acid groups and when applied as an enamel to copper wire gives a smoother film than products made by Belgian Pat. 650,979 and also gives a greater build with less coats.

Infrared analysis of the product prepared from trimellitic anhydride and 4,4'-diisocyanatodiphenyl methane (available commercially as Multrathane M or Hylene M) showed absorption maximum at $5.67\mu$ and $5.86\mu$ for imide and at $8.06\mu$ for amide as did a commercial product made from trimellitic acid mono chloride and methylene dianiline. However, the polyamide-imide made from the trimellitic anhydride was stronger in imide and weaker in amide absorption than the commercial product from the acid chloride. This is consistent with the product of the invention being an amide-imide and the commercial product being an amide-imide-amic acid prior to curing.

For best results the trimellitic anhydride and diisocyanate are used in equimolar amounts. The ratio can vary from 0.90 to 1.0 mole of diisocyanate to trimellitic anhydride. If a lower ratio of isocyanate is employed, e.g. 0.80 mole the molecular weight of the product is too low and if more isocyanate is employed, e.g. 1.20 moles the product fails the snap test when applied to copper wires.

It is critical that the amount of diisocyanate be not over 1.0 mole per mole of trimellitic anhydride. If the diisocyanate be as much as 1.1 moles (or higher) per mole of diisocyanate as taught in Muller Pat. 3,314,923 it is not possible to prepare a satisfactory wire enamel since no storage stability is possible. Instead, the viscosity of the product advances rapidly, eventually gelling. This is shown for example in Examples 8 and 9 infra.

To retard increases in viscosity on standing due to the presence of unreacted isocyanate groups there can be added to the wire enamel (or to the reactant) blocking agents such as phenols such as phenol per se, cresylic acid, m-p-cresol, p-cresol, o-cresol, xylenol or the like. While the presence of such phenols in the enamels is preferred their use is not essential.

As the aromatic diisocyanates there is preferably employed 4,4'-diisocyanatodiphenyl methane. Other aromatic diisocyanates which can be used include toluene diisocyanate (either the 2,4-isomer, the 2,6-isomer or mixtures of such isomers), 4,4'-bi-o-tolylene diisocyanate (Isocyanate 136T) 4,4' - methylene - di - o - tolylisocyanate (Hylene DDM), m-phenylene diisocyanate, 4-methoxy-1, 3-phenylene diisocyanate, 4-chloro - 1,3 - phenylene diisocyanate, 4-isopropyl-1,3-phenylene diisocyanate, 2,4'-diisocyanatodiphenyl ether, 4,4'-diisocyanatodiphenyl ether, 3,3'-dimethyl-4,4'-diisocyanatodiphenyl methane, mesitylene diisocyanate, durylene diisocyanate, 3,3'-bitolylene-4, 4'-diisocyanate, 1,5-naphthalene diisocyanate, 4,4'-diisocyanatodiphenyl sulfone.

It has also been found desirable on occasion to introduce urea groups in the polyamide-imide. Such groups can be introduced by replacing 1 to 50 equivalent percent of the trimellitic anhydride with 1 to 50 equivalent percent of an aromatic diamine. Preferably when the diamine is employed it is used to replace 5 to 30 equivalent percent of the trimellitic anhydride.

As the aromatic diamine there can be employed methylene dianiline (4,4'-diaminophenyl methane), oxydianiline (4,4'-diaminophenyl ether), benzidine, p-phenylene diamine, 3,3'-diaminodiphenyl, 1,4-diamino naphthalene, 4,4'-diaminodiphenyl ketone, 4,4'-diaminodiphenyl sulfone, bis-(4-aminophenyl)-d,d'-p-xylene diamine.

While reference is made to a diisocyanate as being employed it should be realized that a triisocyanate having one of the isocyanate groups blocked will act as a diisocyanate below the unblocking temperature. An example of such a partially blocked triisocyanate is toluene diisocyanate trimer having one of its isocyanate groups blocked with phenol or cresol.

It has also been found desirable to replace 1 to 5 equivalent percent of the diisocyanate with 1 to 5 equivalent percent of an isocyanate having a functionality of at least three. Examples of such polyisocyanates are the cyclic trimer of 2,6-tolylene diisocyanate (Desmodur IL), PAPI (polymethylene polyphenylisocyanate having an average of 3.1 isocyanate groups per molecule), the trimer of 4,4'-diphenyl methane diisocyanate, 1,3,5-triisocyanatobenzene, Mondur SH (mixed cyclic trimers of 2,4- and 2,6-tolylene diisocyanates having the three free isocyanate groups blocked by esterification with m-cresol) Mondur S (the reaction product of 3 moles of mixed 2,4- and 2,6-tolylene diisocyanate with trimethylol propane wherein the isocyanate groups are blocked by esterification with phenol), 4,4',4'-triphenyl methane triisocyanate, 2,4,6-triisocyanatotoluene, 2,4,6-triisocyanatodiphenyl ether, 2,2',4-triisocyanatodiphenyl ether, 2,2',4-triisocyanatodiphenyl sulfide, 2,3',4-triisocyanato-4'-methyl diphenyl ether, 2,3',4-triisocyanato-4'-methoxydiphenyl ether, 2,4,4'-triisocyanato-3',5'-dichlorodiphenyl ether, 2,4,4'-diphenyl triisocyanate.

The reaction between the diisocyanate and trimellitic anhydride can be carried out in the absence of a catalyst but preferably a tertiary amine catalyst is employed, e.g. in an amount of 1 to 30% of the weight of the trimellitic anhydride. Suitable tertiary amines include triethylamine, tripropyl amine, diethyl propyl amine, tributyl amine, triisobutylamine, triamyl amine, methyl-diethyl amine, triphenylamine, N,N-dimethyl aniline, N,N-diethyl aniline, N-ethyl-N-benzylaniline.

The polyamide-imide forming reaction is normally carried out in the presence of the same solvents used to form the wire enamel. Thus there can be used N-methyl pyrrolidone, dimethyl acetamide, dimethyl formamide, dimethyl sulfoxide, N-methyl caprolactan, cresylic acid, p-cresol, m-p-cresol mixture, dimethyl sulfone, phenol. Mixtures of solvents can be used, e.g. blends of N-methyl pyrrolidone with dimethyl acetamide and/or dimethyl formamide, a mixture of N-methyl pyrrolidone, dimethyl acetamide and toluene (6:3:4); a mixture of N-methyl pyrrolidone and xylene; a mixture of phenol, cresylic acid and Solvesso 100.

Both aliphatic and aromatic hydrocarbons can be used as diluents, e.g. aromatic naphthas such as Solvesso 100, toluene, xylene, and aliphatic hydrocarbons such as octane, decane, dodecane and tetradecane.

The polyamide-polyimide (or polyamide-polyimide-polyurea) is employed as a wire enamel while in solution in a solvent system such as those specified above. It is applied to an electrical conductor, e.g. copper, silver, aluminum or stainless steel wire in conventional fashion, e.g. by the "free dip" method or the "die application" procedure both of which procedures are described in Meyer Pat. 3,201,276. Wire speeds of 15 to 36 feet per minute can be used with wire tower temperatures of 250 to 800° F., usually with a final temperature of above 500° F. The build-up of the polyamide-imide enamel on the wire can be 0.005 to 0.010 inch, preferably 0.002 to 0.004 inch using No. 18 wire. The wire is passed through the enamel one or more times until the desired build up is obtained. (The build up is the total increase in diameter over the bare wire diameter.)

Unless otherwise indicated all parts and percentages are by weight. When reference is made to equivalents it should be noted that for the isocyanates each isocyanate group is one equivalent and for the amines each amino group is one equivalent.

EXAMPLE 1

125 parts of 4,4'-diisocyanatodiphenyl methane (Multrathane M), 96 parts of trimellitic anhydride, 15 parts of triethyl amine, 240 parts of cresylic acid, 302 parts of phenol and 122 parts of Solvesso 100 were stirred at 300° F. for 8 hours and then for 18 hours at 350° F. under reflux. The wire enamel thus prepared had a viscosity of U (Gardner-Holdt) at 27.2% solids at 400° F. for one hour.

The wire enamel was then run on No. 18 copper wire to give a product having the following properties:

Six coat build—2.1 mils
Heat shock 20% stretch 240° C., for 30 minutes—
  1×M 30
  2×M 90
  3×M 90
  4×M 100
Cut through—320–340° C.
Burn out (4 min. 33 amps.)—4.0 kv.
AIEE 57 heat life, hours at 280° C.—1152+.

All viscosities in this and the other examples are Gardner-Holdt viscosities.

A commercial polyamide-imide wire enamel known as Type 10 and made from trimellitic anhydride monoacid chloride and methylene dianiline only had a six coat build of 2.4 mils and did not provide as smooth an enamel.

EXAMPLE 2

0.5 mole of Multrathane M was dissolved in 525 grams of dry N-methyl pyrrolidone. 0.05 mole of 4,4'-diaminophenyl methane (methylene dianiline) was added slowly and then 0.45 mole of trimellitic anhydride was slowly added. The batch was heated for 14 hours at 300° F. and then cooled to room temperature. The viscosity of the batch was Z5+ at 32.3% solid and two days later the viscosity was Z8+ and in nine days it was Z10+. The product (both at Z5+ and at Z10+) was suitable for use as a wire enamel.

EXAMPLE 3

The procedure of Example 2 was repeated but using a reaction temperature of 250° F. The product at the end of the heating had a viscosity of U at 30.4% solids. This batch did not advance in viscosity in eleven days. The product was useful as a wire enamel.

To 143 grams of the initial product there were added 14 grams of cresylic acid to block unreacted isocyanate groups. No change in viscosity was observed in nine days.

EXAMPLE 4

The procedure of Example 2 was repeated and the heating was stopped when the product had a Z4+ viscosity at 31% solids. After 3 days the viscosity was Z5+ and 50 grams of cresylic acid were added to block unreacted isocyanate groups. The product was useful as a wire enamel.

EXAMPLE 5

192 grams (1.0 mole) of trimellitic anhydride, 235 grams (0.94 mole) of Multrathane M, 995 grams of dry N-methyl pyrrolidone and 335 grams of dry EW naphtha (enamel wire heavy coal tar naphtha) were heated to 300° F. in 45 minutes and held there for 10 hours. The reaction temperature was then increased to 350° F. and held there for six hours. Finally the batch was heated for two hours at 375° F. at which time the viscosity had increased to Z5. 200 grams of N-methyl pyrrolidone were added to reduce the viscosity to Z2+. The yield was 1680 grams of product with 24.3% solids. The wire enamel composition thus obtained was stable. Thus the viscosity was still Z2+ after 39 days. The NCO content of the solid resin (i.e. on a solvent free basis) was 0.535%.

EXAMPLE 6

384 grams (2.0 moles) of trimellitic anhydride, 490 grams (1.96 moles) of Multrathane M, 1990 grams of dry N-methyl pyrrolidone and 670 grams of dry EW naphtha were mixed and heated for 20 hours at 300° F. The final viscosity was Z5–Z6 at 27.2% solids with a yield of 3099 grams. The product was reduced to 22.2% solids and Z2 viscosity by the addition of 430 grams of N-methyl pyrrolidone and 150 grams of EW naphtha. This product was also quite stable and was used as a wire enamel as set forth below. Its viscosity was only Z2+ after 43 days. The NCO content of the solid resin was 2.46%.

EXAMPLE 7

384 grams (2.0 moles) of trimellitic anhydride, 500 grams (2.0 moles) of Multrathane M, 1990 grams of dry N-methyl pyrrolidone and 670 grams of dry EW naphtha were heated for 19 hours at 280–300° F. The final viscosity was Z6 at 26.9% solids with a yield of 3037 grams. 1500 grams of the product was reduced with 215 grams of N-methyl pyrrolidone and 75 grams of EW naphtha to a viscosity of Z2 at 21% solids. 50 days later the viscosity was Z3–Z4. It was found that the enamel made a smoother wire enamel if reduced to 17.7% solids and a Z1 viscosity. The Z2 21% solids composition was used in the tests reported before. The NCO content of the solid resin was 2.16%.

EXAMPLE 8

192 grams (1.0 mole) of trimellitic anhydride, 255 grams (1.06 moles) of Multrathane M, 1335 grams of dry N-methyl pyrrolidone and 335 grams of dry EW naphtha were heated for 11 hours at 300° F. The final viscosity was Z6–Z7 and the product was thinned with a mixture of 50 grams of cresylic acid, 300 grams of N-methyl pyrrolidone and 100 grams of EW naphtha to Z2 viscosity at 22% solids with a yield of 1919 grams. This product gelled on standing for 20 days and hence was not suitable as a commercial wire enamel which must have storage stability.

1260 grams of the product was thinned with 300 grams of N-methyl pyrrolidone 13 days after it was made. The viscosity was Z2-1/4 at 17.7% solids. It was used in the tests reported below. The NCO content of the solid resin was 1.18%. The thinned batch gelled four days after it was made.

EXAMPLE 9

192 grams (1.0 mole) of trimellitic anhydride, 265 grams (1.06 mole) of Multrathane M, 1335 grams of dry N-methyl pyrrolidone and 387 grams of dry EW naphtha were heated for 3 hours at 275° F. followed by 6 hours at 300° F. The product was thinned with 50 grams of cresylic acid to a final viscosity of Y–Z at 22.25% solids and a yield of 1953 grams. One month later the viscosity was Z6. 1507 grams of this product was thinned with 200 grams of N-methyl pyrrolidone to a viscosity of Z–1/4 at 19.6% solids. The viscosity increased to Z3+ in a month and was Z7–Z8 after 55 days. Hence it was too unstable to be a satisfactory wire enamel. The thinned product was used in the tests reported below. The NCO content of the solid resin was 1.75%.

In contrast to the results obtained in Examples 8 and 9 the products made in accordance with the invention did not show advances in viscosity even over long periods of time.

EXAMPLE 10

384 grams (2.0 moles) of trimellitic anhydride, 500 grams (2.0 moles) of Multrathane M, 1990 grams of dry N-methyl pyrrolidone and 670 grams of dry Solvesso 100 were heated for 17 hours at 300° F. The viscosity was Z5–Z6 at 24.8% solids with a yield of 2982 grams. 1500 grams of the product was reduced with 338 grams of N-methyl pyrrolidone and 114 grams of EW naphtha to a viscosity of Z1+ at 18.3% solids.

EXAMPLE 11

96 grams (0.5 mole) of trimellitic anhydride, 123.5 grams (0.495 mole) of Hylene M (p,p'-diisocyanatodiphenyl methane), 6.05 grams of Mondur TM (4,4',4''-triisocyanatotriphenyl methane) 20% solution in methylene chloride, 15 grams of triethylamine and 664 grams of dry N-methyl pyrrolidone was heated for 7 hours at 250° F. to give a wire enamel with a viscosity of W+ at 24.9% solids. The 6.05 grams of Mondur TM solution contained 0.0033 mole of the triisocyanate.

EXAMPLE 12

96 grams (0.5 mole) of trimellitic anhydride, 121 grams (0.485 mole) of Multrathane M, 10.8 grams of Desmodur IL solution (0.01 mole of the cyclic trimer of toluene diisocyanate as a 51% solution in butyl acetate), 664 grams of dry N-methyl pyrrolidone and 2 grams of triethylamine were heated at 230° F. for 4 hours to give a product with a viscosity of U- at 24.9% solids. The product was used in the tests reported below.

EXAMPLE 13

96 grams (0.5 mole) of trimellitic anhydride, 121 grams of Multrathane M (0.475 mole), 18.3 grams (0.01 mole) of Mondur TM solution, 164 grams of dry N-methyl pyrrolidone and 2 grams of triethylamine were heated at 225° F. for 3 hours at which time the viscosity of the resulting wire enamel was X–Y at 24.9% solids.

EXAMPLE 14

96 grams (0.5 mole) of trimellitic anhydride, 125 grams (0.5 mole) of Hylene M, 664 grams of dry N-methyl pyrrolidone and 15 grams of trimethylamine were heated slowly from room temperature to 200° F. in 9 hours and then were heated for 10 hours at 225 to 250° F. The product had a viscosity of U–V at 25.6% solids. It was used in the tests reported below.

EXAMPLE 15

518 grams (2.7 moles) of trimellitic anhydride, 675 grams (2.7 moles) of Multrathane M, 3586 grams of dry N-methyl pyrrolidone and 81 grams of triethylamine were heated for 8 hours at 250° F. until the viscosity was U–V at 25.9% solids with a yield of 4282 grams. The product was used in the tests reported below.

EXAMPLE 16

384 grams (2.0 moles) of trimellitic anhydride, 500 grams (2.0 moles) of Multrathane M and 2656 grams of dry N-methyl pyrrolidone were heated for 5 hours at 300° F. until the viscosity was U–V at 25.9% solids with a yield of 3172 grams. The product was used in the tests reported below.

It was observed in repeating the procedure of Example 7 that the reaction proceeded smoothly in the presence of an alkaline catalyst, e.g. triethylamine, at 250° F. while in the absence of a catalyst at temperatures of 300° F. was required. If cresylic acid is the solvent then 350° F. is the preferred reaction temperature.

The following tests were carried out on No. 18 copper wire coated by the die application procedure using the wire enamels of the indicated examples.

TABLE 1

| Ex. | Tower temp., °F. | Speed, ft./min. | Smoothness | Mandrel before snap | Snap | Mandrel after snap |
|---|---|---|---|---|---|---|
| 6 | 750 | 30 | Good— | 1X | OK | 4X |
| 7 | 750 | 30 | ——do—— | 1X | OK | 3X |
| 8 | 750 | 30 | Good—— | 1X | OK | 3X |
| 10 | 750 | 30 | Good—— | 1X | OK | 4X |
| 11 | 750 | 30 | Wavy—— | 1X | OK | 2X |
| 12 | 750 | 30 | ——do—— | 1X | OK | 3X |
| 14 | 650 | 20 | ——do—— | 1X | OK | 3X |
| 15 | 750 | 30 | ——do—— | 1X | OK | 2X |
| 16 | 650 | 20 | Good—— | 1X | OK | 2X |

TABLE 2

| Example | 30 min. heat shock at 240° C., 20% stretch | | | | Cut through, °C. | Build | Flex aging, hours, 3×M (at 175° C.) | Heat aging, hrs. at— | |
| | 1X | 2X | 3X | 4X | | | | 280° C. | 310° C. |
|---|---|---|---|---|---|---|---|---|---|
| 6 | 40 | 100 | 100 | 100 | 342–341 | 2.4 | 120+ | 1,500+ | 125 |
| 7 | 20 | 90 | 90 | 100 | 320–360 | 2.3 | F120 | | 168 |
| 8 | 30 | 100 | 100 | 100 | 325–312 | 1.9 | F144 | 930+ | 97 |
| 10 | 40 | 90 | 100 | 100 | 315–360 | 2.7 | OK168 | | |
| 11 | 0 | 60 | 90 | 80 | 228–222 | 2.7 | F168 | | |
| 12 | 0 | 0 | 10 | 70 | 320–310 | 2.6 | F120 | | |
| 14 | 30 | 90 | 90 | 100 | 340–320 | 2.1 | F168 | 1,634 | 146 |
| 15 | 50 | 100 | 100 | 100 | 325–320 | 2.7 | OK168 | 2,500+ | 226 |
| 16 | 10 | 90 | 100 | 100 | 310–318 | 2.6 | OK168 | 2,280 | 205 |

The heat aging samples at 280° C. for Examples 6, 7, 8, 10 and 15 were still on test without failure.

The product of Example 10 in six passes of No. 18 copper wire gave a good smooth wire with a 2.7 mil build. In contrast a commercial amide-imide (Amoco AI–220) such as that disclosed in the Belgian patent gave a maximum build for smooth wire of 2.4 mil.

Frequently it is desirable to topcoat the polyamide-imide coated wire with a linear polyimide. The top coat can be 0.5 to 1.5 mils thick and can be of any conventional polyimide such as those shown in Smith Pat. 3,168,-417, column 2, line 34 to column 3, line 69 and claim 1 and Edwards Pat. 3,179,634, column 1, line 16 to column 2, line 28; column 5, line 61 to column 6, line 53; Examples 1–35 and claim 1. The entire disclosure of the Smith and Edwards patents are hereby incorporated by reference, no need being seen for reproducing their disclosures herein.

A typical example of such a polyimide topcoating is one prepared from equimolar amounts of pyromellitic dianhydride and oxydianiline. A somewhat similar polyimide is prepared by replacing the oxydianiline by methylene dianiline.

Thus in a specific example No. 18 copper wire which had a 2 mil coating of the polyamide-imide prepared in Example 10 was given a topcoat of a polyimide prepared from equimolar parts of pyromellitic dianhydride and oxydianiline. The polyimide dissolved in N-methyl pyrrolidone at 25% solids was applied to the polyamide-imide coated wire by several passes to give a 1 mil polyimide topcoating.

What is claimed is:

1. A process of preparing a polyamide-imide-urea substantially free of amic acid groups consisting essentially of condensing 1 mole of a mixture of 99 to 50 mole percent trimellitic anhydride together with 1 to 50 mole percent of a carbocyclic aromatic diamine with 0.9 to 1.0 mole of a carbocyclic aromatic diisocyanate in an inert solvent.

2. A film forming polyamide-imide-urea prepared according to claim 1.

3. An electrical conductor having a continuous coating of the polyamide-imide-urea of claim 2.

4. A process according to claim 1 wherein the diamine is methylene dianiline.

5. A process according to claim 1 wherein the diisocyanate is 4,4'-diisocyanatodiphenyl methane.

6. A process according to claim 1 wherein a portion of the diisocyanate up to 5 equivalent percent of the total isocyanate is replaced by a polyisocyanate having a functionality of at least three.

7. A film forming polyamide-imide-urea prepared according to claim 6.

8. An electrical conductor having a continuous coating of the polyamide-imide-urea of claim 7.

References Cited

UNITED STATES PATENTS

| 3,489,696 | 1/1970 | Miller | 260—2.5 |
| 3,260,691 | 7/1966 | Lavin et al. | 260—30.2 |
| 3,314,923 | 4/1967 | Muller et al. | 260—78 |
| 3,347,828 | 10/1967 | Stephens et al. | 260—47 |

FOREIGN PATENTS

| 1,473,600 | 2/1967 | France | 260—78 |
| 6,615,344 | 5/1967 | Netherlands | 260—78 |

OTHER REFERENCES

A Novel Condensation Polymerization, Meyers, A.C.S., Abstracts, Division Of Polymer Chemistry, April 14–18, 1967.

WILLIAM H. SHORT, Primary Examiner

L. L. LEE, Assistant Examiner

U.S. Cl. X.R.

117—75, 128.4; 260—30.2, 30.8R, 30.8DS, 32.4, 32.6N, 33.4P, 33.6R, 47CB, 47CP, 77.5R, 78TF